United States Patent
Kim et al.

(10) Patent No.: US 10,462,043 B2
(45) Date of Patent: Oct. 29, 2019

(54) METHOD AND APPARATUS FOR APPLYING NESTED NETWORK CORDING IN MULTIPATH PROTOCOL

(71) Applicant: Samsung Electronics Co., Ltd., Suwon-si, Gyeonggi-do (KR)

(72) Inventors: Suk Won Kim, Yongin-si (KR); Hyun Jeong Kang, Seoul (KR); Sang Wook Kwon, Yongin-si (KR); Jong Hyung Kwun, Seoul (KR); June Hwang, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 155 days.

(21) Appl. No.: 14/473,234

(22) Filed: Aug. 29, 2014

(65) Prior Publication Data

US 2015/0063211 A1   Mar. 5, 2015

(30) Foreign Application Priority Data

Aug. 29, 2013   (KR) .......................... 10-2013-0103310

(51) Int. Cl.
*H04L 29/06* (2006.01)
*H04L 12/707* (2013.01)

(52) U.S. Cl.
CPC .............. *H04L 45/24* (2013.01); *H04L 69/14* (2013.01)

(58) Field of Classification Search
CPC ..... H04B 1/713; H04B 7/0413; H04B 7/0697
See application file for complete search history.

(56) References Cited

U.S. PATENT DOCUMENTS

| | | | | |
|---|---|---|---|---|
| 6,359,877 B1* | 3/2002 | Rathonyi | .............. | H04L 1/0002 370/232 |
| 6,788,686 B1* | 9/2004 | Khotimsky | ............. | H04L 47/10 370/389 |
| 7,212,528 B2* | 5/2007 | Kuhl | ................... | H04L 12/5601 370/389 |
| 7,254,824 B1* | 8/2007 | Gordon | ................ | H04N 5/4401 348/E5.005 |
| 7,408,938 B1* | 8/2008 | Chou | ..................... | H04H 20/42 370/394 |
| 8,130,776 B1* | 3/2012 | Sundararajan | .......... | H04L 47/27 370/401 |
| 8,250,426 B2* | 8/2012 | Larsson | ................ | H04L 1/1845 714/748 |
| 8,488,498 B2* | 7/2013 | Yue | ....................... | H04L 1/0041 370/310 |

(Continued)

*Primary Examiner* — Mansour Oveissi
*Assistant Examiner* — Jonathan Wood
(74) *Attorney, Agent, or Firm* — Jefferson IP Law, LLP

(57) ABSTRACT

A method of communicating with a User Equipment (UE) through a multipath transmission control protocol is provided. The method includes receiving information, by a first node, on a packet requested by the UE and information on a buffer state of the UE from the UE, exchanging, by the first node, information on a packet to be transmitted/received to/from each of one or more second nodes, determining, by the first node, a combination of packets which maximizes a coding gain and throughput of the UE and a transmission sequence by using the exchanged information on the packet, and transmitting, by the first node, packets to the UE according to the determined combination of the packets and the transmission sequence.

13 Claims, 13 Drawing Sheets

(56) References Cited

U.S. PATENT DOCUMENTS

| | | | |
|---|---|---|---|
| 8,842,716 B2* | 9/2014 | Kent | H04B 1/7085 370/328 |
| 8,918,902 B1* | 12/2014 | Kim | G06F 21/31 726/28 |
| 9,094,326 B2* | 7/2015 | Sundararajan | H04L 47/193 |
| 9,143,274 B2* | 9/2015 | Zeger | H04L 5/16 |
| 9,258,145 B2* | 2/2016 | Alfonso | H04L 12/6418 |
| 2002/0114269 A1* | 8/2002 | Onggosanusi | H04L 1/0618 370/208 |
| 2002/0114401 A1* | 8/2002 | Kim | H03M 13/2771 375/262 |
| 2002/0131364 A1* | 9/2002 | Virtanen | H04L 63/0227 370/230 |
| 2002/0141338 A1* | 10/2002 | Burke | H04L 12/6418 370/229 |
| 2004/0151157 A1* | 8/2004 | Nishimura | H04L 12/189 370/349 |
| 2004/0192312 A1* | 9/2004 | Li | H04L 1/16 455/445 |
| 2005/0086363 A1* | 4/2005 | Ji | H04L 45/00 709/235 |
| 2006/0093066 A1* | 5/2006 | Jeong | H04L 1/0001 375/299 |
| 2006/0107189 A1* | 5/2006 | Wenger | H03M 13/47 714/776 |
| 2006/0109805 A1* | 5/2006 | Malamal Vadakital | H04L 29/06027 370/299 |
| 2006/0193271 A1* | 8/2006 | Proctor, Jr. | H04B 7/022 370/294 |
| 2006/0291392 A1* | 12/2006 | Alicherry | H04L 45/02 370/235 |
| 2007/0133608 A1* | 6/2007 | Isambart | H04N 17/004 370/484 |
| 2008/0086662 A1* | 4/2008 | Li | H04L 1/0003 714/704 |
| 2008/0175195 A1* | 7/2008 | Cho | H04L 1/1607 370/329 |
| 2008/0205314 A1* | 8/2008 | Pecen | H04L 47/10 370/310 |
| 2008/0259878 A1* | 10/2008 | Connors | H04W 72/005 370/336 |
| 2008/0279110 A1* | 11/2008 | Hart | H04L 12/2697 370/248 |
| 2008/0304447 A1* | 12/2008 | Kim | H04L 1/1877 370/329 |
| 2009/0154345 A1* | 6/2009 | Schollmeier | H04L 45/02 370/228 |
| 2010/0027424 A1* | 2/2010 | Radunovic | H04W 40/04 370/238 |
| 2010/0042876 A1* | 2/2010 | Yue | H04L 1/0003 714/704 |
| 2010/0046371 A1* | 2/2010 | Sundararajan | H04L 1/004 370/235 |
| 2010/0157878 A1* | 6/2010 | Zeitler | H04B 7/155 370/315 |
| 2010/0165915 A1* | 7/2010 | Kuechler | H04L 1/205 370/328 |
| 2011/0041041 A1* | 2/2011 | Kim | H04L 1/1819 714/780 |
| 2011/0051727 A1* | 3/2011 | Cai | H04L 12/1877 370/390 |
| 2011/0064015 A1* | 3/2011 | Yue | H04L 1/0041 370/312 |
| 2011/0142141 A1* | 6/2011 | Huang | H03M 13/3761 375/242 |
| 2011/0188597 A1* | 8/2011 | Agee | H04B 7/0413 375/267 |
| 2011/0194487 A1* | 8/2011 | Namburi | H04L 47/14 370/328 |
| 2011/0243324 A1* | 10/2011 | Lima | H04L 1/1812 380/212 |
| 2011/0250897 A1* | 10/2011 | Seo | H04B 7/2606 455/445 |
| 2011/0261812 A1* | 10/2011 | Kini | H04L 12/4633 370/389 |
| 2011/0296006 A1* | 12/2011 | Krishnaswamy | H04L 29/12952 709/224 |
| 2011/0307765 A1* | 12/2011 | Kim | H04L 1/0047 714/776 |
| 2012/0008547 A1* | 1/2012 | Yokoyama | H04B 7/155 370/315 |
| 2012/0134258 A1* | 5/2012 | Ni | H04L 45/04 370/218 |
| 2012/0147899 A1* | 6/2012 | Du | H04L 12/413 370/447 |
| 2012/0155468 A1* | 6/2012 | Greenberg | H04L 45/24 370/392 |
| 2012/0188873 A1* | 7/2012 | Nakatsugawa | H04L 1/0003 370/231 |
| 2012/0188934 A1* | 7/2012 | Liu | H04L 12/1863 370/312 |
| 2012/0314655 A1* | 12/2012 | Xue | H04L 1/0076 370/328 |
| 2012/0331160 A1* | 12/2012 | Tremblay | H04L 29/08702 709/228 |
| 2013/0016727 A1* | 1/2013 | Tazzari | H04L 69/324 370/400 |
| 2013/0064198 A1* | 3/2013 | Krishnaswamy | H04W 76/025 370/329 |
| 2013/0114481 A1* | 5/2013 | Kim | G06F 15/16 370/310 |
| 2013/0195004 A1* | 8/2013 | Hampel | H04L 69/16 370/315 |
| 2013/0195106 A1* | 8/2013 | Calmon | H04B 7/15521 370/389 |
| 2013/0279331 A1* | 10/2013 | Pluntke | H04L 45/24 370/230 |
| 2013/0318239 A1* | 11/2013 | Scharf | H04L 69/16 709/224 |
| 2013/0322287 A1* | 12/2013 | Bontu | H04L 1/0015 370/252 |
| 2013/0332621 A1* | 12/2013 | Keller | H04L 65/60 709/231 |
| 2014/0153489 A1* | 6/2014 | Perras | H04W 60/00 370/328 |
| 2014/0201318 A1* | 7/2014 | Dajani | H04L 69/16 709/217 |
| 2014/0201587 A1* | 7/2014 | Luby | H04L 1/0643 714/751 |
| 2014/0201604 A1* | 7/2014 | Wang | H04L 1/0057 714/782 |
| 2014/0226677 A1* | 8/2014 | Mendes Alves da Costa | H04L 1/0076 370/417 |
| 2014/0334489 A1* | 11/2014 | Bosshart | H04L 45/745 370/392 |
| 2014/0351447 A1* | 11/2014 | Annamalaisami | H04L 65/1069 709/227 |
| 2015/0006749 A1* | 1/2015 | Hendel | H04L 47/34 709/230 |
| 2015/0029944 A1* | 1/2015 | Nama | H04L 5/0091 370/329 |
| 2015/0043383 A1* | 2/2015 | Farkas | H04L 45/22 370/254 |
| 2015/0049677 A1* | 2/2015 | Lin | H04L 1/0011 370/329 |
| 2015/0049751 A1* | 2/2015 | Liew | H04L 1/0048 370/338 |
| 2015/0236819 A1* | 8/2015 | Zhovnirnovsky | H04L 1/08 370/216 |
| 2015/0237525 A1* | 8/2015 | Mildh | H04W 28/0215 370/230.1 |

(56) References Cited

U.S. PATENT DOCUMENTS

| | | | |
|---|---|---|---|
| 2015/0327244 A1* | 11/2015 | Pajukoski | H04L 5/0005 370/330 |
| 2016/0112170 A1* | 4/2016 | Li | H04L 25/0204 370/329 |
| 2016/0183276 A1* | 6/2016 | Marinier | H04W 72/02 370/329 |

* cited by examiner

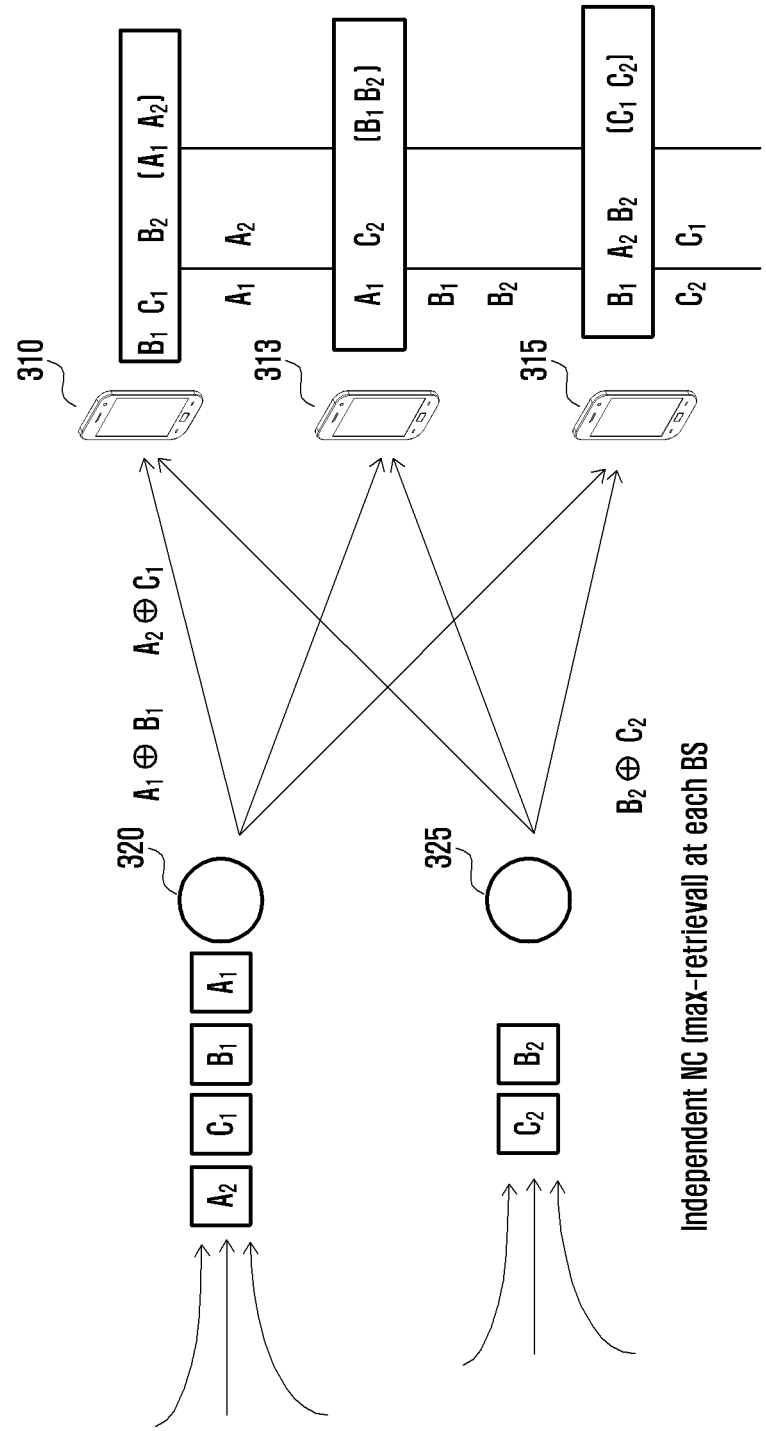

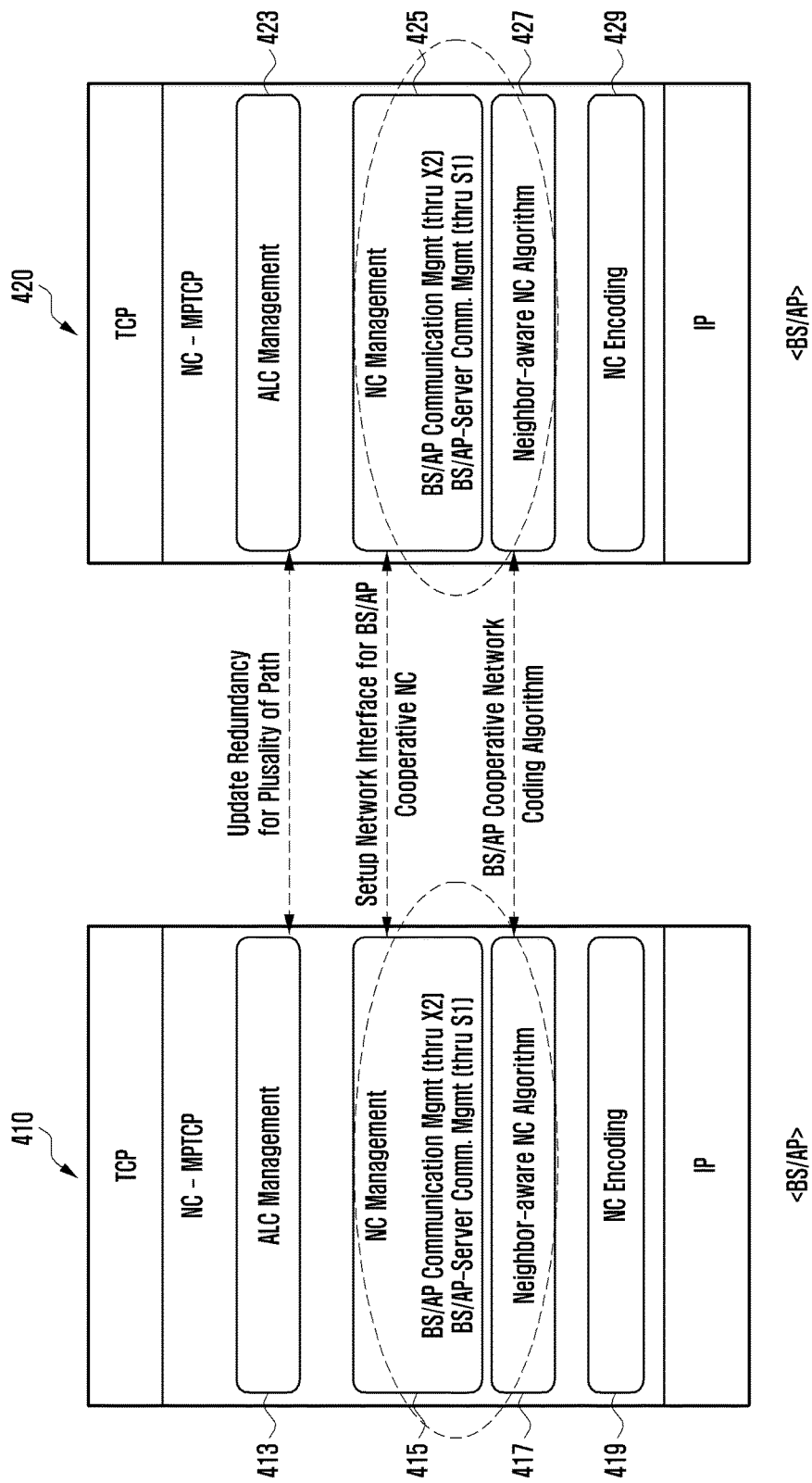

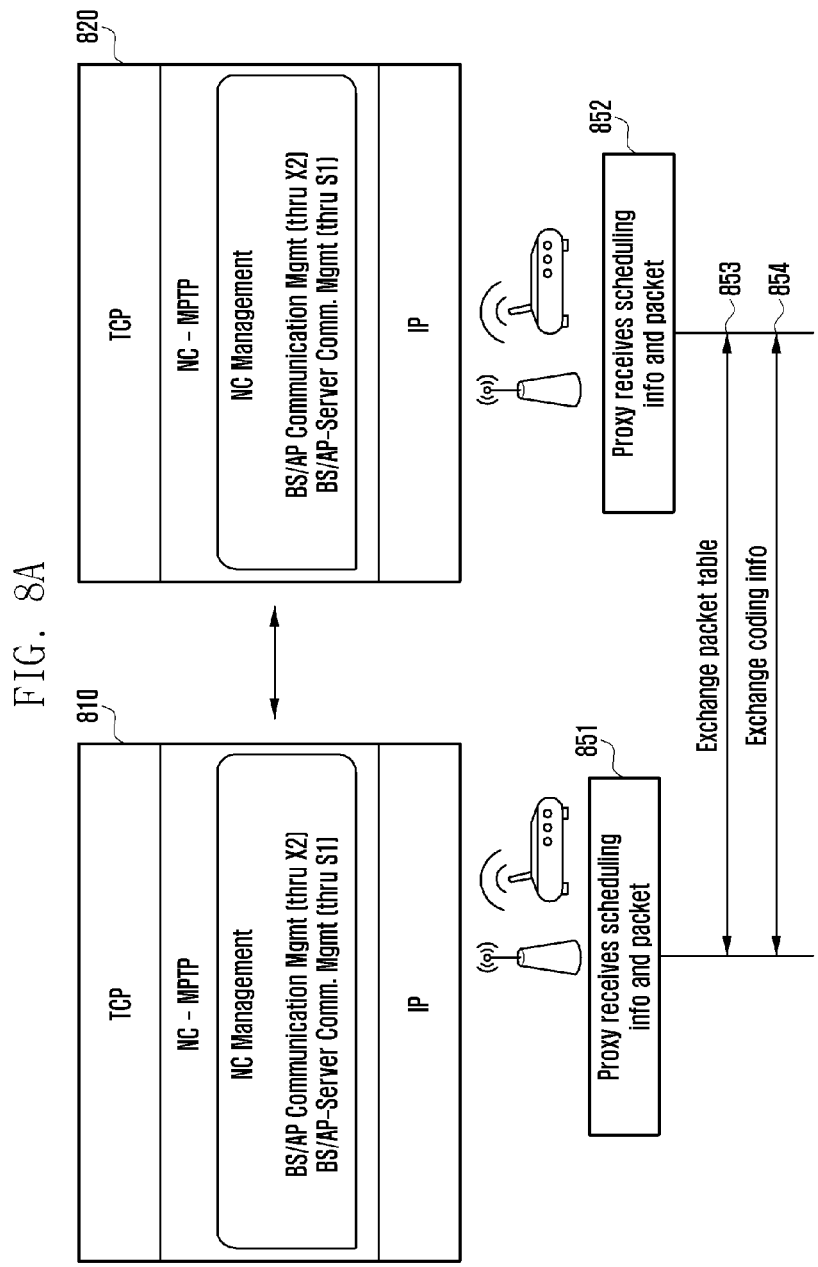

FIG. 9

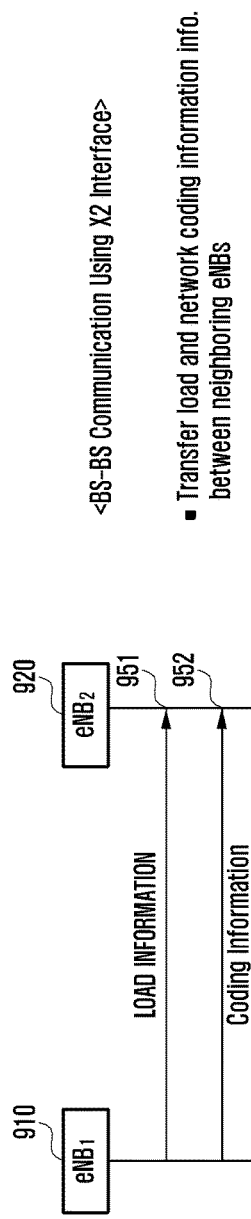

<BS-BS Communication Using X2 Interface>

■ Transfer load and network coding information info. between neighboring eNBs

| IE/Group Name | Presence | Range | IE type and reference | Semantics description | Criticality |
|---|---|---|---|---|---|
| Message Type | M | | 9.2.13 | | YES |
| Cell Information | M | 1 .. <maxCellineNB> | | | YES |
| >Cell Information Item | | | | | EACH |
| >>Cell ID | M | | ECGI 9.2.14 | Id of the source cell | – |
| >>UL Interference Overload Indication | O | | 9.2.17 | | – |
| >Coding Information Item | | | | | |
| >>Coding Info Period | | 0~ $p_1$ | | Length of period for coded packet table | |
| >>Coded-packet Info during Period | | 0~ $p_2$ | | Packet sequence # | |
| >>Coding Strategy | | 0~ $p_3$ | | Coding indicator [0,1] & Coding strategy # (ex: XOR =1, Linear=2..) | |
| >>Coding Coefficients | | 0~ $p_4$ | | Coding coefficients # | |

FIG. 12

- Communicate through S1 interface between BS and server
- BS makes request for deadline/redundancy synchronization to proxy
- Proxy determines whether deadline synchronization is possible in consideration of queue state and packet characteristic and transmits feedback thereof
- Proxy determines whether redundancy synchronization is possible in consideration of spare bandwidth and queue state and transmits feedback thereof

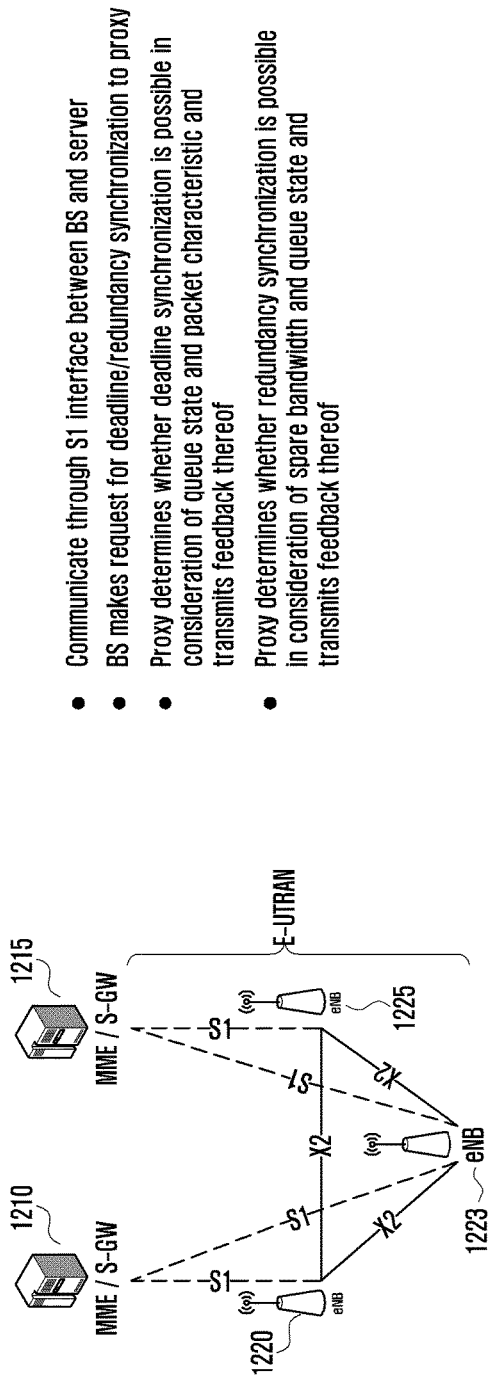

| Elementary Procedure | Initiating Message | Successful Outcome | Unsuccessful Outcome |
|---|---|---|---|
| Handover Preparation | HANDOVER REQUIRED | HANDOVER COMMAND | HANDOVER PREPARATION FAILURE |
| Handover Resource Allocation | HANDOVER REQUEST | HANDOVER REQUEST ACKNOWLEDGE | HANDOVER FAILURE |
| Path Switch Request | PATH SWITCH REQUEST | PATH SWITCH REQUEST ACKNOWLEDGE | PATH SWITCH REQUEST FAILURE |
| Handover Cancellation | HANDOVER CANCEL | HANDOVER CANCEL ACKNOWLEDGE | |
| ... | | | |
| 1250 — Deadline Synchronization | DEADLINE SYNC REQUEST | DEADLINE SYNC FEEDBACK | DEADLINE SYNC FAILURE |
| 1260 — Redundancy Synchronization | REDUNDANCY SYNC REQUEST | REDUNDANCY SYNC SUCCESS FEEDBACK | REDUNDANCY SYNC FAILURE |

METHOD AND APPARATUS FOR APPLYING NESTED NETWORK CORDING IN MULTIPATH PROTOCOL

CROSS-REFERENCE TO RELATED APPLICATION(S)

This application claims the benefit under 35 U.S.C. § 119(a) of a Korean patent application filed on Aug. 29, 2013 in the Korean Intellectual Property Office and assigned Serial number 10-2013-0103310, the entire disclosure of which is hereby incorporated by reference.

TECHNICAL FIELD

The present disclosure relates to a method of using a nested coding in actual cellular/Wireless Fidelity (WiFi) environment by applying linear coding to a proxy server and network coding to a Base Station (BS)/Access Point (AP). Accordingly, the performance of a multipath protocol is improved by preventing a packet loss and also a coding gain using the network coding.

BACKGROUND

A multipath Transmission Control Protocol (TCP) has been proposed to increase the TCP throughput due to the diversity and also increase the reliability by opening multiple paths per TCP session in comparison with a conventional single path TCP. A representative use case of a MultiPath TCP (MPTCP) is data offloading applying the MPTCP to 3G/WiFi.

FIGS. 1A, 1B, and 1C illustrate a multipath Transmission Control Protocol (TCP) according to the related art.

Referring to FIGS. 1A to 1C, the MultiPath TCP (MPTCP) largely has two problems.

First, a random packet loss may occur. For example, as illustrated in FIG. 1A, when packets 4, 5, 6, 7, 8, and 9 are transmitted from a source 110 to a destination 120, packets 4, 6, 8, and 9 are transmitted through a first path 130 and the remaining packets 5 and 7 are transmitted through a second path 140. At this time, as illustrated in FIG. 1B, a packet loss may occur in the second path 140. Packets 5 and 7 to be transmitted through the second packet 140 may not be transmitted through the second path 140 but may be transmitted to the destination 120 through the first path 130. As described above, due to the packet loss which may occur in each path, out-of-ordered packets are generated and thus a TCP window size is reduced, thereby reducing the overall TCP throughput.

Next, an end-to-end delay variation may occur. The end-to-end delay refers to an amount of time spent while the packet is transmitted from the source to the destination. As illustrated in FIG. 1C, since respective paths have different path qualities in the multipath TCP, the end-to-end delay varies depending on the path. At this time, in the TCP, sequences of the received packets should be accurate. Accordingly, a request for reordering packets may be generated due to a difference of the delay according to the respective paths and thus a latency problem may happen. Further, since a User Equipment (UE) is required to wait for a packet from a poor quality path having a serious delay, the poor quality path may correspond to a bottleneck and the overall performance may be reduced.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of communicating with a User Equipment (UE) through a multipath transmission protocol of a plurality of nodes and a node device communicating with the UE through the multipath transmission control protocol. Also, another aspect of the present disclosure is to meet the above described requirements and applies nested coding in an environment where multiple proxies, multiple nodes, and multiple users exist. At this time, the node device may include at least one of a Base Station (BS) and an Access Point (AP) but is not limited thereto.

Further, in another aspect of the present disclosure a proxy server and a BS/AP are provided to perform an adaptive linear coding so that capability deterioration due to the packet loss can be prevented. Also, the BS/AP performs a BS/AP cooperative network coding, thereby reducing transmission power and increasing the throughput due to the generation of a coding gain.

The technical subjects pursued in the present disclosure may not be limited to the above mentioned technical subjects, and other technical subjects which are not mentioned may be clearly understood, through the following descriptions, by those skilled in the art of the present disclosure.

In accordance with an aspect of the present disclosure, a method of communicating with a User Equipment (UE) through a multipath transmission control protocol of a plurality of nodes is provided. The method includes receiving, by a first node, information on a packet requested by the UE and information on a buffer state of the UE from the UE, exchanging information, by the first node, on a packet to be transmitted/received to/from each of one or more second nodes, determining, by the first node, a combination of packets which maximizes a coding gain and throughput of the UE and a transmission sequence by using the exchanged information on the packet, and transmitting, by the first node, packets to the UE according to the determined combination of the packets and the transmission sequence.

In accordance with another aspect of the present disclosure, the determining of the combination of the packets may include selecting a first combination of packets which meets a need of a largest number of UEs, selecting a second combination of packets which meets the need of the largest number of UEs among remaining packets except for the packets included in the first combination, and determining the transmission sequence which maximizes the coding gain and the throughput of the UE by controlling transmission sequences of the first combination and the second combination.

In accordance with another aspect of the present disclosure, the information on the packet may include at least one of information on a period indicating a previous time for which coding is performed, information on a packet participating in coding for a corresponding period, coding strategy information indicating information on how coding is performed, and information on a coding coefficient used for coding.

In accordance with another aspect of the present disclosure, the exchanging of the information on the packet may include performing the exchange by inserting, by the first node, the information on the packet to be transmitted/received to/from each of the one or more second nodes into an X2 interface.

In accordance with another aspect of the present disclosure, when the first node receives packets from a plurality of servers, the method may further include transmitting, by the first node, a packet deadline and redundancy synchronization request message to the plurality of servers, receiving, by the first node, a message indicating whether deadlines and redundancies can be synchronized from the servers, and combining, by the first node, packets having the synchronized deadlines and redundancies and transmitting the combination of the packets to the UE.

In accordance with another aspect of the present disclosure, the transmission of the synchronization request message and the reception of the message indicating whether the synchronization may be performed are made through an S2 interface and the S2 interface may include a deadline synchronization process including information on a deadline synchronization success or failure and a redundancy synchronization process including information on a redundancy synchronization success or failure.

In accordance with another aspect of the present disclosure, a node device communicating with a UE through a multipath transmission control protocol with one or more other nodes is provided. The node device includes a communication unit configured to receive information on a packet requested by the UE and information on a buffer state of the UE from the UE, a network coding management module configured to control the node to exchange information on a packet to be transmitted/received to/from each of the one or more other nodes, and a neighbor-aware network coding algorithm configured to determine a combination of packets which maximizes a coding gain and throughput of the UE and a transmission sequence by using the exchanged information on the packet, wherein the communication unit is configured to transmit packets to the UE according to the determined combination of the packets and the transmission sequence.

In accordance with another aspect of the present disclosure, by applying a linear coding to a proxy and applying a Network Coding (NC) to a BS/AP, a coding gain due to the network coding is generated and thus throughput can increase.

Further, in accordance with another aspect of the present disclosure, based on a BS/AP cooperative NC algorithm through cooperation between BSs/APs according to an embodiment of the present disclosure, an effect of the network coding can be maximized.

Moreover, in accordance with another aspect of the present disclosure, a signaling procedure required for such a process, a communication signaling procedure between BSs/APs through an X2 interface, and a signaling procedure between the BS/AP and a server through an S1 interface can be provided.

In addition, in accordance with another aspect of the present disclosure, it is possible to increase throughput on receiving sides, reduce a delay due to packet-reordering, and efficiently manage a buffer.

Effects obtainable from the present disclosure may not be limited to the above mentioned effects, and other effects which are not mentioned may be clearly understood, through the following descriptions, by those skilled in the art of the present disclosure.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description in conjunction with the accompanying drawings, in which:

FIG. 3 illustrates an example in which a network coding is applied to a Base Station (BS)/Access Point (AP) according to an embodiment of the present disclosure;

FIG. 4 illustrates an architecture of a Base Station (BS) or an Access Point (AP) according to an embodiment of the present disclosure;

FIGS. 8A and 8B illustrate an example of a communication method for exchanging packet information previously transmitted between nodes according to various embodiments of the present disclosure;

FIG. 9 illustrates an example of a communication method between nodes using an X2 interface according to an embodiment of the present disclosure;

FIG. 12 illustrates an example of a communication method between a Base Station (BS)/Access Point (AP) and a server according to an embodiment of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A communication system according to an embodiment of the present disclosure may include multiple servers, multiple nodes (e.g., node devices), or multiple users. At this time, the node may include at least one of a Base Station (BS) and an Access Point (AP) but is not limited thereto. For example, the node may include an AP controller, AP management entity, a network connection/management entity and the like. Hereinafter, for the convenience of the description, embodiments of the present disclosure will be described with an example of considering at least one of the BS and the AP as the node. Further, the convenience of the description, the node may be interchangeable with the BS or the AP. The server may be a proxy server, but is not limited thereto. The server may include all servers which transmit information to a User Equipment (UE). For the convenience of the description, the server and the proxy server may be interchangeable with each other.

Figure 1A:
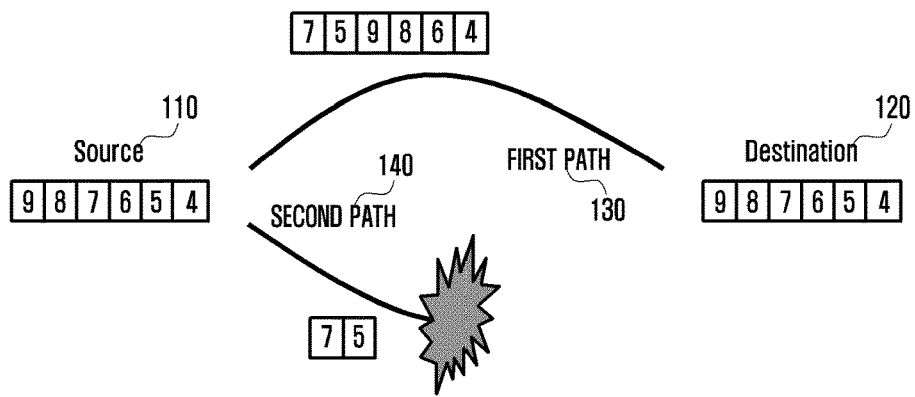
FIGS. 1A, 1B and 1C illustrate a multipath Transmission Control Protocol (TCP) according to the related art.
Figure 1B:
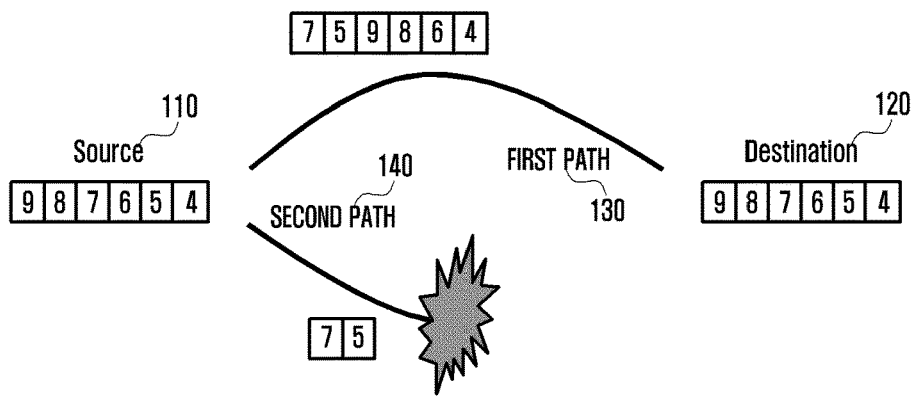
Figure 1C:
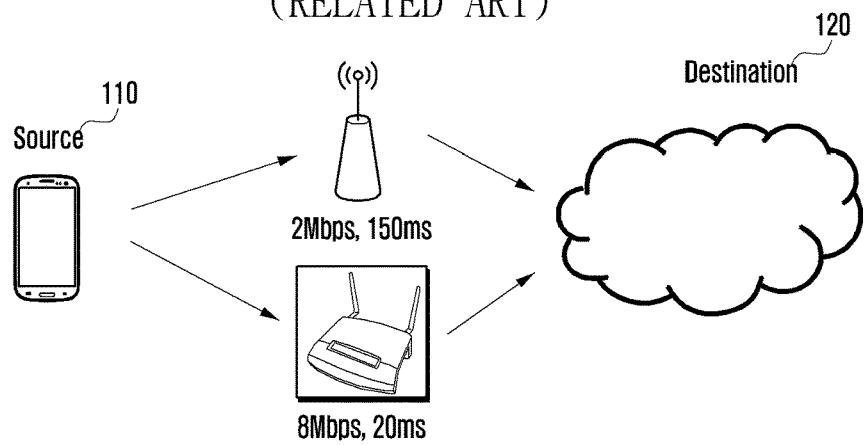
Figure 2A:
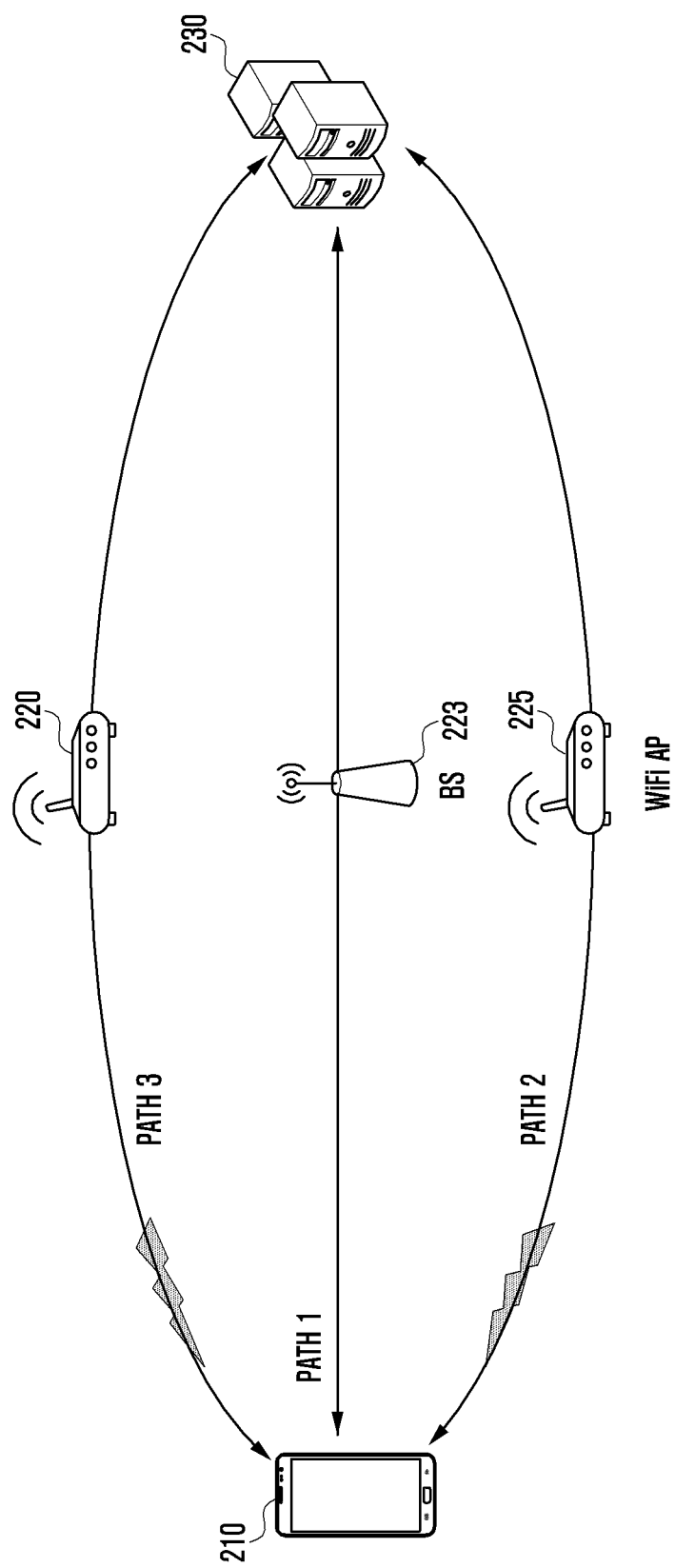
FIG. 2A illustrates a linear coding in a multipath TCP according to an embodiment of the present disclosure.

FIG. 2A illustrates a linear coding in a multipath Transmission Control Protocol (TCP) according to an embodiment of the present disclosure.

Referring to FIG. 2A, respective paths (e.g., path 1, path 2 and path 3) having different path qualities in a multipath TCP are illustrated, in which a UE 210 communicates to an end server 230 on the respective paths using various nodes 220, 223 and 225, where node 223 may be a BS and node 225 may be a WiFi AP, and in which an adaptive linear coding according to the path quality may be applied. At this time, it is possible to prevent the TCP throughput deterioration by applying redundancy through the linear coding and preventing the packet loss before it occurs. Specifically, the packet loss can be prevented by controlling a coding block size according to a state change of the path or controlling a coding rate according to a state change of the path. Further, scheduling may be performed in consideration of a delay difference between paths.

The adaptive linear coding may be performed by inserting a Network Coding (NC)-MultiPath Transmission Control Protocol (MPTCP) layer into the end server 230 to support the MPTCP and coding by the end server 230. However, in this case, the linear coding should be performed by the end server 230, so a problem to directly modify the end server 230 occurs. Accordingly, a method of combining the coding with cellular/WiFi is needed for actual commercialization.

Figure 2B:
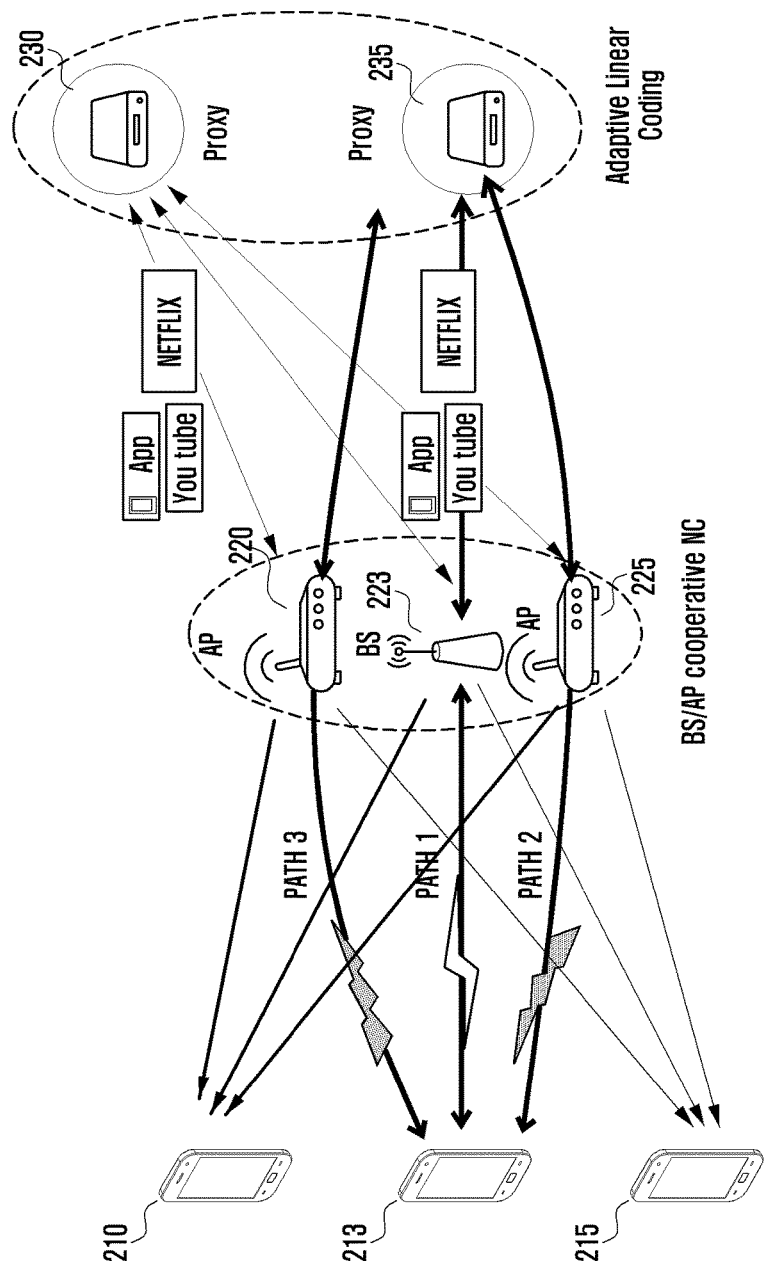
FIG. 2B illustrates a nested coding in a multipath TCP according to an embodiment of the present disclosure.

FIG. 2B illustrates nested coding in a multipath TCP according to an embodiment of the present disclosure.

Referring to FIG. 2B, UE 210, UE 213 and UE 215 are illustrated, where at least one of the UEs 210, 213 and 215 communicate to send/receive packets A (e.g., application packet, YouTube™ packet or Netflix™ packet) to an end server 230 using paths 1, 2 and 3, in which the end server 230 may prevent a packet loss through adaptive linear coding. Further, nodes 220, 223, and 225 (e.g., node devices) may obtain a network coding gain through a node cooperative network coding. At this time, the end server 230 may be a proxy server in some embodiments. Further, in some embodiments, the nodes 220, 223, and 225 may be Base Stations (BSs) or Wireless Local Access Network (WLAN) Access Points (Aps).

In this case, in the multipath TCP system according to an embodiment of the present disclosure, an overall gain according to the nested coding may be a sum of a gain according to the prevention of the packet loss and a gain according to the network coding in the nodes.

Hereinafter, architectures of the BS or the AP and the proxy server and a BS/AP cooperative neighbor-aware network coding algorithm through cooperation between APs or BSs will be described in detail. In some embodiments, a protocol scheme using an X2 interface may be used for the cooperation between BSs/APs. Further, in some embodiments, a protocol scheme using an S1 interface may be used for communication between the BS/AP and the server.

FIG. 3 illustrates an example in which a network coding is applied to a BS/AP according to an embodiment of the present disclosure.

Referring to FIG. 3, it may be noted that a coding gain may be generated by selecting a proper network code when network coding is applied to BSs or APs 320 and 325 (e.g., Independent NC (max-retrieval) at each BS).

For example, a first UE 310 may have packets B1, C1, and B2, a second UE 313 may have packets A1 and C2, and a third UE 315 may have packets B1, A2, and B2. At this time, the first UE 310 may desire to receive packets A1 and A2, the second UE 313 may desire to receive packets B1 and B2, and the third UE 315 may desire to receive packets C1 and C2.

The first BS 320 may transmit packets A1, A2, B1, and C1 to the first UE 310, the second UE 313, and the third UE 315, and the second BS 325 may transmit packets B2 and C2 to the first UE 310, and the second UE 313. In some embodiments, the first BS 320 or the second BS 325 may be a WLAN AP.

In this case, the first BS 320 and the second BS 325 do not separately transmit packets A1, A2, B1, B2, C1, and C2 through six transmissions. Instead, the first BS 320 may transmit packets A1+B1 and A2+C1 and the second BS 325 may transmit packet B2+C2 as illustrated in FIG. 3. Accordingly, the first BS 320 and the second BS 325 may transmit the packets, which the first UE 310, the second UE 313, and the third UE 315 desire to receive, through a total of three transmissions. At this time, a coding gain may be 6/3=2.

In some embodiments, when the first BS 320 and the second BS 325 select a combination of the packets to be transmitted without any cooperation from another BS, the first BS 320 and the second BS 325 may preferentially select packets which can meet the need of the largest number of UEs as the combination of the packets to be transmitted. That is, the first BS 320 may select a combination of packets which can best meet the requests of the first UE 310, the second UE 313, and the third UE 315 regardless of packets which the second BS 325 will transmit or has already transmitted. For example, the first BS 320 may perform a network coding by combining packets A1 and B1 which can meet the requests of the first UE 310 and the second UE 313. However, in this case, the first BS 320 selects a combination of the packets regardless of the packets which the second BS 325 will transmit. Accordingly, even though particular packets are transmitted to the first UE 310 to the third UE 315, if the first UE 310 to the third UE 315 require previous packets, the UEs should wait until the previous packets are transmitted, so that the efficiency of the buffer management deteriorates. This will be described in detail later.

Hereinafter, the architecture of the BS or the AP or a detailed algorithm for combining packets to be transmitted by the BS or the AP will be described in detail.

FIG. 4 illustrates an architecture of a BS or an AP according to an embodiment of the present disclosure.

Referring to FIG. 4, BSs or APs 410 and 420 according to an embodiment of the present disclosure may include Adaptive Linear Coding (ALC) management modules 413 and 423, NC management modules 415 and 425, neighbor-aware NC algorithms 417 and 427, and networking coding encoders 419 and 429. The BSs or APs 410 and 420 may utilize TCP, NC MPTCP and Internet Protocol (IP).

The ALC management modules 413 and 423 may perform a function of updating a redundancy of the plurality of paths as described above regarding FIG. 2A. Further, the NC management modules 415 and 425 may perform a function of configuring (e.g., setting up) a network interface for a cooperative network coding of the BSs or the APs 410 and 420. At this time, the NC management modules 415 and 425 may include a BS/AP communication management module for communication between BSs/APs and a BS/AP-server communication management module for communication between the BS/AP and the server. Further, the neighbor-aware network coding algorithms 417 and 427 may serve to provide a cooperative network coding algorithm of the BSs or the APs 410 and 420. The NC encoders 419 and 429 may encode packets. A detailed description thereof will be made below.

Referring to FIG. 4, although the ALC management modules 413 and 423, the NC management modules 415 and 425, and the neighbor-aware network coding algorithms 417 and 427 are illustrated as separated blocks, the present disclosure is not limited thereto. For example, the function of the NC management modules 415 and 425 and the function of the neighbor-aware network coding algorithms 417 and 427 may be performed by one management module. Alternatively, operations performed by the ALC management modules 413 and 423, the NC management modules 415 and 425, and the neighbor-aware network coding algorithms 417 and 427 may be performed by one controller.

Figure 5:
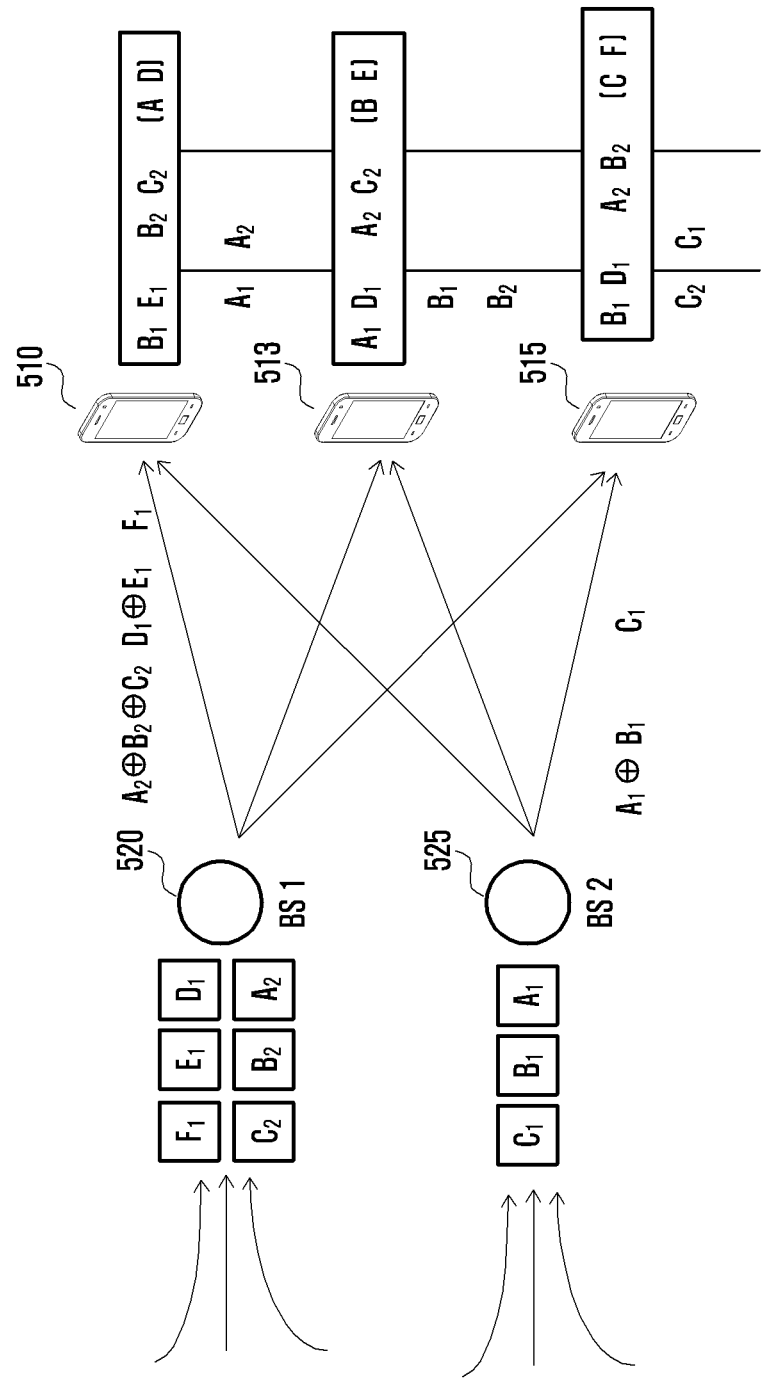
FIG. 5 illustrates an example of a network coding by a Base Station (BS) or an Access Point (AP) according to an embodiment of the present disclosure.

FIG. 5 illustrates an example of network coding by a BS or an AP according to an embodiment of the present disclosure.

Referring to FIG. 5, a first BS 520 and a second BS 525 transmitting packets to a first UE 510, a second UE 513, and a third UE 515 are illustrated. At this time, in some embodiments, the first BS 520 or the second BS 525 may be a WLAN AP.

For example, the first UE 510 may have packets B1, E1, B2, and C2, the second UE 513 may have packets A1, D1, A2, and C2, and the third UE 515 may have packets B1, D1, A2, and B2. Further, the first UE 510 may desire to receive packets A and D, the second UE 513 may desire to receive packets B and E, and the third UE 515 may desire to receive packets C and F. At this time, the first BS 520 may transmit packets A2, B2, C2, D1, E1, and F1 to the first UE 510, the second UE 513, and the third UE 515, and the second BS 525 may transmit packets A1, B1, and C1 to the first UE 510, the second UE 513, and the third UE 515.

Referring to FIG. 5, the first BS 520 and the second BS 525 may independently perform code selection and apply the network coding without any cooperation with each other. At this time, each of the BSs 520 and 525 may perform the code selection to meet the need of as many UEs 510, 513, and 515 as possible through only one transmission. In this case, the first BS 520 may select and transmit a combination of packets A2+B2+C2 which can meet the request of the first UE 510, the second UE 513, and the third UE 515 at the same time.

However, in a case where transmission of a prior packet should be made such as real time video streaming through a multipath protocol, since the first UE 510 to the third UE 515 have not received packets A1 and B1 and/or C1 even though they have received packets A2+B2+C2 from the first BS 520, it may not be helpful to immediately reproduce contents even though each of the packets A2, B2, and C2 has been decoded. Further, the UEs 510, 513, and 515 are required to store packets A2, B2, and C2 which have already been received in the buffer until receiving packets A1, B1, and C1, causing deterioration in the efficiency of the buffer management due to the storage of unnecessary packets.

Figure 6:
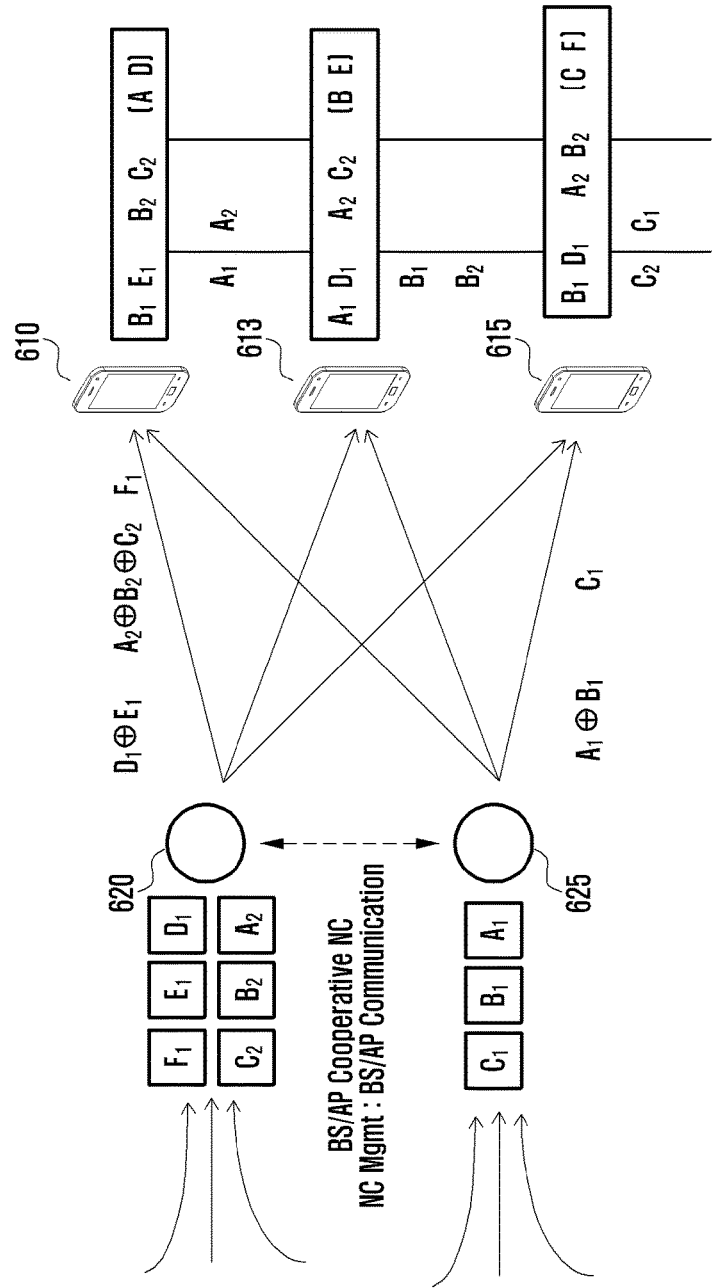
FIG. 6 illustrates an example of a network coding by a Base Station (BS) or an Access Point (AP) according to an embodiment of the present disclosure.

FIG. 6 illustrates an example of network coding by a BS or an AP according to an embodiment of the present disclosure.

Referring to FIG. 6, a first BS 620 and a second BS 625 may select a combination of packets which should be first transmitted among packets which the BSs 620 and 625 will transmit by identifying, through communication, packets which have been previously transmitted or should be transmitted.

For example, UE 610 may have packets B1, E1, B2, and C2, UE 613 may have packets A1, D1, A2, and C2, and UE 615 may have packets B1, D1, A2, and B2. Further, the UE 610 may desire to receive packets A and D, the UE 613 may desire to receive packets B and E, and the UE 615 may desire to receive packets C and F.

For example, only when the second BS 625 transmits a packet combination A1+B1 before the first BS 620 transmits a packet combination A2+B2+C2, UEs 610, 613, and 615 having received the packet combinations can decode the corresponding packets upon receipt of the packet combinations and reproduce corresponding contents. Accordingly, the first BS 620 and the second BS 625 identify the previously transmitted packets thereof, and thus the first BS 620 may first transmit a packet combination D1+E1 instead of transmitting the packet combination A2+B2+C2. Through the change in transmission sequences of the packet combinations, the UEs 610, 613, and 615 may first receive A1+B1 from the second BS 625 at a first timing and thus reproduce corresponding contents upon receipt of A2+B2+C2.

As described above, by exchanging information on the previously transmitted packets, the BSs 620 and 625 may transmit packet combinations according to the changed sequences of the packet combinations but may maintain the same number of packet combinations to be transmitted in comparison with FIG. 5. At this time, the UEs 610, 613, and 615 may reproduce corresponding contents upon receipt of the packets, thereby increasing the throughput of receiving sides, that is, the UEs 610, 613, and 615. Further, since the need for the UEs 610, 613, and 615 to store the received packets until another packet is received may decrease, overheads due to the use of unnecessary buffers can be reduced. Further, when the UEs 610, 613, and 615 do not sequentially receive packets even though sequential reception of the packets is required for the reproduction of contents, the delay due to re-ordering of the received packets which may be generated to reproduce corresponding contents can also be prevented.

Figure 7:
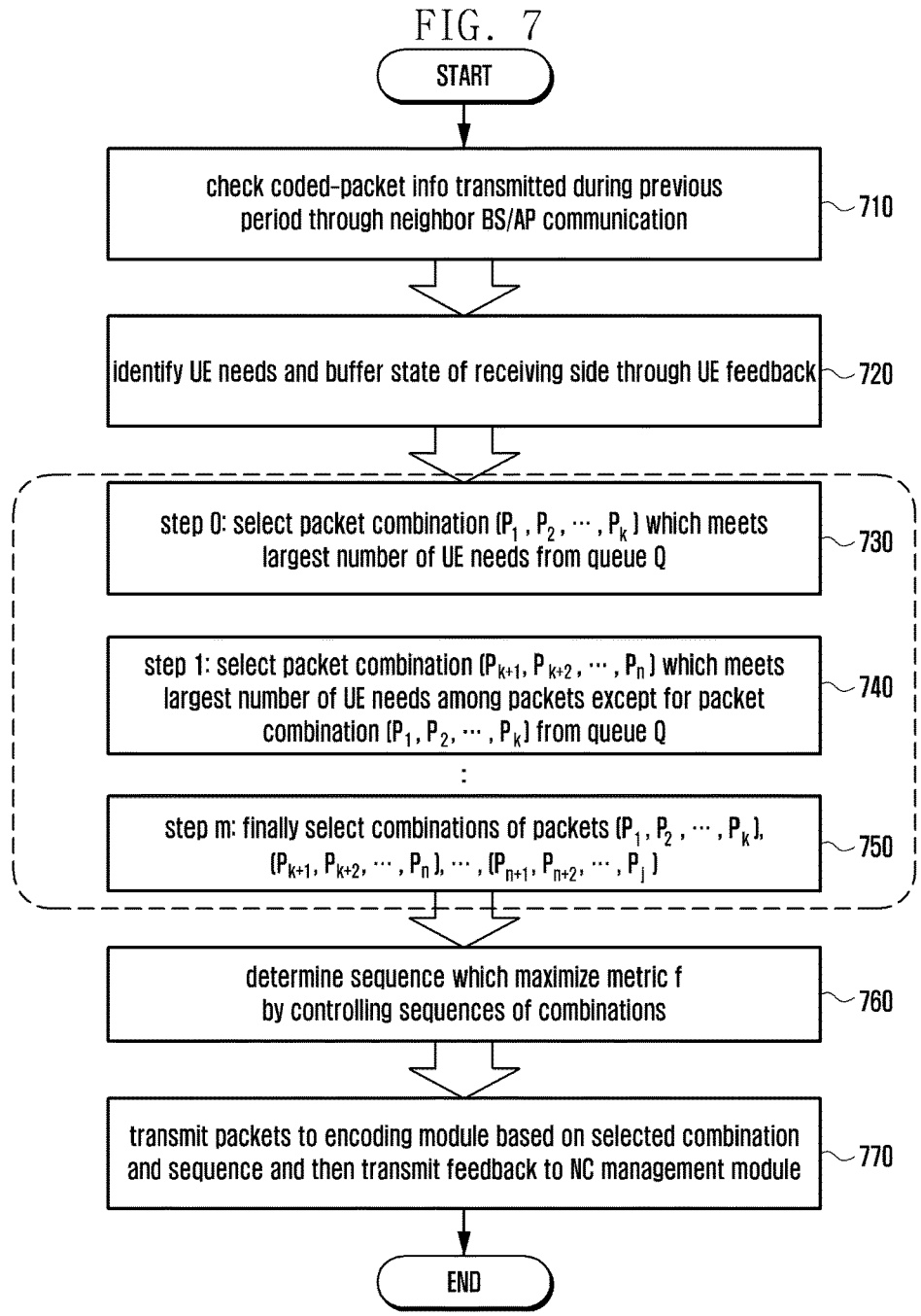
FIG. 7 illustrates a node cooperative neighbor-aware Network Code (NC) greedy algorithm according to an embodiment of the present disclosure.

FIG. 7 illustrates a node cooperative neighbor-aware NC greedy algorithm according to an embodiment of the present disclosure.

Referring to FIG. 7, when a BS or an AP applies network coding, the node cooperative neighbor-aware NC greedy algorithm may be used to maximize an effect at a receiving side, that is, the UE. In this case, in consideration of packets which each BS (or AP) stores in a corresponding queue and code selection by a neighbor BS (or neighbor AP) of the corresponding BS (or AP), a metric f which can maximize a coding gain and throughput of the UE may be defined as shown in Equation (1) below.

$$f(p_1^1, \ldots, p_k^1), \ldots, (p_1^n, \ldots, p_j^n); b_1, \ldots b_m)$$ Equation (1)

In Equation (1), f refers to an output when each node configures a packet combination and a transmission sequence and applies a network coding according to a corresponding sequence of the packet combination and is calculated by a network coding gain and throughput of the receiving side. Further, pi refers to a packet of a corresponding node and bi refers to packets of a neighboring node of the corresponding node.

Referring to FIG. 6, a first node 620 may configure packet combinations and transmission sequences as A2+B2+C2, D1+E1, and F1. At this time, by transmitting A2+B2+C2, D1+E1, and F1, a coding gain of 6/3=2 may be generated. However, the receiving sides 610, 613, and 615 cannot reproduce A2+B2+C2 due to the nonexistence of the previous packets, that is, A1 and B1 even though the receiving sides 610, 613, and 615 have received A2+B2+C2 and should wait for one time slot, so that a penalty (−1) may be generated in the throughput of the receiving sides 610, 613, and 615.

In contrast, when the first node 620 determines the packet combinations and the transmission sequences as A2+B2+C2, D1+E1, and F1, the same coding gain of 6/3=2 may be generated. However, in this case, the receiving sides 610, 613, and 615 can receive the transmitted packets at every time slot, so that the penalty is not generated and thus the throughput of the receiving sides may be larger than the above described case.

Accordingly, in this case, f((D1, E1), (A2, B2, C2), (F1); (A1, B1, C1))>f((A2, B2, C2), (D1, E1), (F1); (A1, B1, C1)) is established.

Hereinafter, an algorithm for determining a packet combination and sequence to maximize the coding gain and the receiving side throughput will be described with reference to FIG. 7. In operation 710, each node may check, through communication with a neighbor node, information on packets participating in the coding for the time when the previous coding is performed. In operation 720, the node may receive a need of the UE and a feedback of a buffer state of the UE from the UE to identify the need and the buffer state of the UE.

Thereafter, in operation 760, the node may acquire the maximum coding gain and receiving side throughput to determine packet combinations and sequences which can maximize the metric f. At this time, when there are n packets in the queue of the node, calculation complexity of O(2n) may be required to determine all available packet combinations and sequences.

In some embodiments, in order to determine optimal packet combinations and sequences while reducing the complexity, the node may perform packet combination selection in operations 730, 740 and 750.

Specifically, the node may select a combination of packets (P1, P2, . . . , Pk) which can meet the need of the largest number of UEs from the queue Q of the node in operation 730. Thereafter, in operation 740, the node may select, from the queue Q, a combination of packets (Pk+1, Pk+2, . . . , Pn) which can meet the need of the largest number of UEs among the remaining packets except for the packets (P1, P2, . . . , Pk) selected in operation 730. Through the repetitive performance of operations 730 and 740, the node may select packets which can meet the need of the largest number of UEs among the remaining packets except for the packets selected in each of operations 730, 740 and 750 until there are no remaining packets in the queue Q. Then, in operation 750, the node may finally select combinations of packets (P1, P2, . . . , Pk), (Pk+1, Pk+2, . . . , Pn), . . . , (Pn+1, Pn+2, . . . , Pj).

Thereafter, in operation 760, the node may control sequences of the selected combinations of the packets to determine sequences of the combinations of the packets which maximize the metric f.

In operation 770, the node may transmit packets to the encoding module based on the packet combinations and sequences selected in operation 760 and may transmit feedback of the selected packet combinations and sequences to the NC management module.

FIGS. 8A and 8B illustrate examples of a communication method for exchanging packet information previously transmitted between nodes according to various embodiments of the present disclosure.

FIG. 9 illustrates an example of a communication method between nodes using an X2 interface according to an embodiment of the present disclosure.

As described above, each BS (or AP) is required to check information on packets previously transmitted by a neighbor BS (or AP) as shown in operation 710 of FIG. 7 in order to perform an algorithm for determining combinations and sequences of packets to be transmitted. Referring to FIG. 4, in some embodiments, the BSs (or APs) 410 and 420 may communicate with a neighbor BS (or AP) through the NC management modules 415 and 425 to exchange information on the previously transmitted packets.

Referring to FIG. 8A, in operations 851 and 852, each BS (or AP) 810 and 820, which, for example, may be similar to BSs or APs 410 and 420 illustrated in FIG. 4, may receive scheduling information and packets to be transmitted by each BS (or AP) from a server.

Thereafter, each BS (or AP) may exchange a packet table with neighbor BSs (or neighbor APs) in operation 853. At this time, the exchanged packet table may be information on packets which each BS (or AP) receives from the server in operations 851 and 852.

In operation 854, the BS (or AP) may exchange coding information with neighbor BSs (or neighbor APs). As illustrated in FIG. 8B, the exchanged coding information may include at least one of information 861 on a period indicating a length of time for which the neighbor BS (or AP) perform a coding, information 862 on packets participating in the coding for the corresponding period, coding strategy information 863 indicating information on how the coding is performed (e.g., XOR and Linear), and information 864 on coding coefficients. In some embodiments, the information exchange between the BSs/APs may be made periodically.

At this time, in some embodiments, communication for the information exchange between the BSs/APs may be performed by the NC management modules as described above. Further, in some embodiments, the communication between the BSs/APs may be performed through the BS/AP communication management module.

Meanwhile, in some embodiments, the communication between BSs/APs may be performed using the X2 interface without using a new interface.

Referring to FIG. 9, while periodically exchanging load information between a first BS 910 (eNB1) and a second BS 920 (eNB2) in operation 951, the first BS 910 and the second BS 920 may insert a coding information section into the load information and transmit the load information in operation 952.

For example, as illustrated in FIG. 9, a coding information section 960 may be added to the X2 interface. At this time, in some embodiments, the coding information may include at least one of information 961 on a period indicating a previous length of time for which the neighbor BS (or AP) performs a coding, information 962 on packets participating in the coding for the corresponding period, coding strategy information 963 indicating information on how the coding is performed (e.g., XOR coding, linear coding, non-linear coding and the like), and information 964 on coding coefficients used for the coding.

Figure 10:
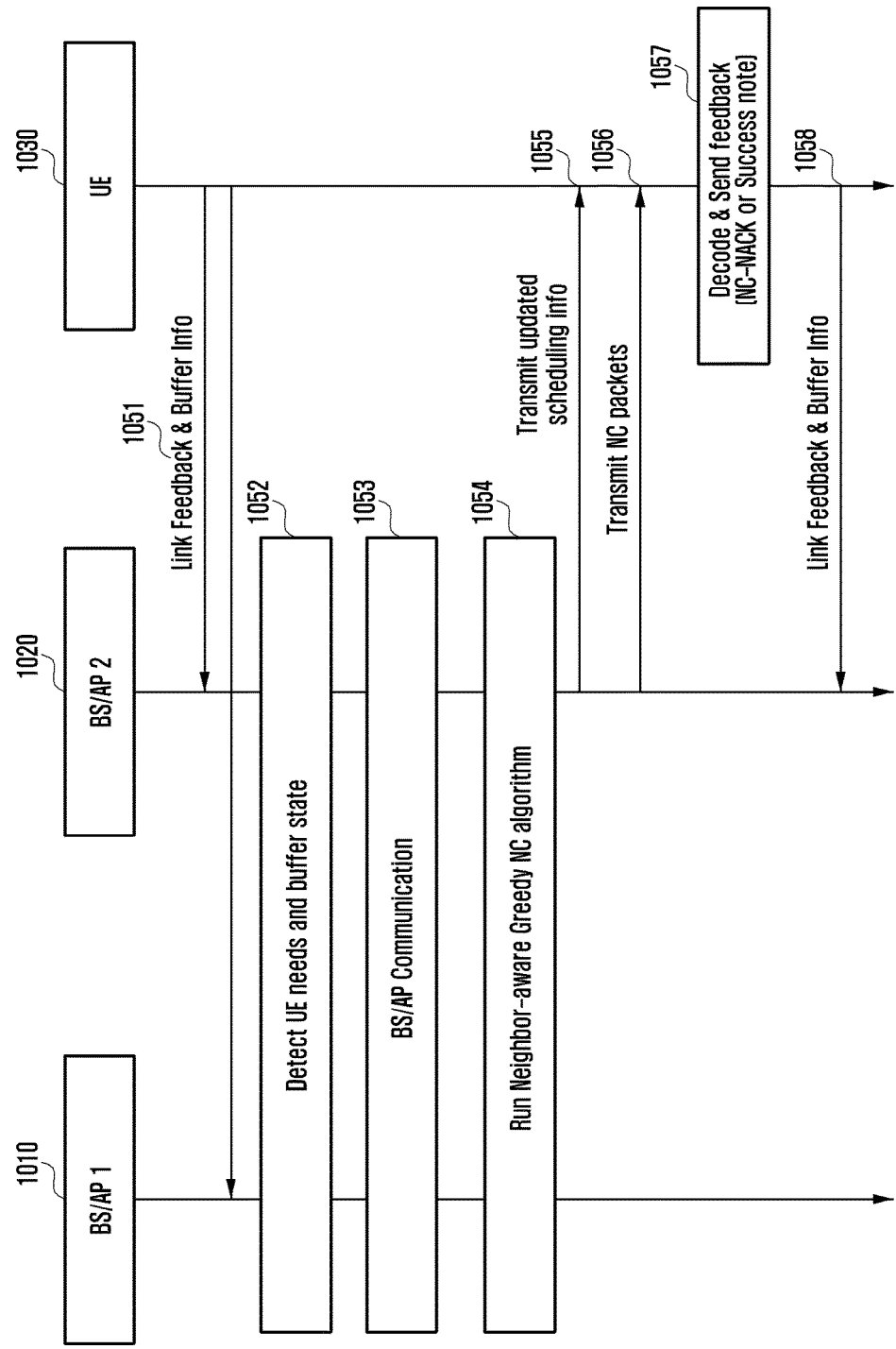
FIG. 10 is a flowchart illustrating a process of a node cooperative Network Code (NC) algorithm according to an embodiment of the present disclosure.

FIG. 10 is a flowchart illustrating a process of a node cooperative NC algorithm according to an embodiment of the present disclosure.

Referring to FIG. 10, a UE 1030 may transmit information on packets requested by the UE 1030 (e.g., link information) and information on a buffer state of the UE 1030 to each of a first BS (or AP) 1010 and a second BS (or AP) 1020 in operation 1051.

Thereafter, in operation 1052, the first BS (or first AP) 1010 and the second BS (or second AP) 1020 may recognize the packets requested (e.g., may recognize needs) by the UE and the buffer state of the UE from the information received from the UE in operation 1051.

In operation 1053, the first BS (or first AP) 1010 and the second BS (or second AP) 1020 may acquire information on packets participating in the coding through communication between the BSs/APs as described above regarding FIGS. 8 and 9. In some embodiments, the information exchange may be made through the X2 interface.

In operation 1054, the first BS (or first AP) 1010 and the second BS (or second AP) 1020 may perform a node cooperative neighbor-aware networking coding greedy algorithm as described above regarding FIG. 7. Through the node cooperative neighbor-aware networking coding greedy algorithm, each BS (or AP) may determine packet combinations which can maximize the coding gain and the throughput of the UE and transmission sequences of the packet combinations.

In some embodiments, in operation 1055, the BSs (or APs) 1010 and 1020 may transmit scheduling information of packet transmission updated through operations 1052 and 1054 to the UE 1030. That is, the BSs (or APs) 1010 and 1020 may transmit information on the packet combinations and the transmission sequences of the packet combinations to the UE 1030.

In operation 1056, the BSs (or APs) 1010 and 1020 may transmit the packets network coded in operations 1052 and 1054 to the UE 1030. The UE 1030 having received the packets may decode the corresponding packets to reproduce contents corresponding to the packets. In some embodiments, the UE 1030 may transmit feedback of information indicating whether the network coding and the reception of the corresponding packet are successful to the BSs (or APs) 1010 and 1020. In operation 1057 the UE 1030 may decode and send feedback (e.g., NC-NACK or Success note) and in operation 1057 the UE 1030 may transmit the link feedback and buffer information to, at least, the second BS (or AP) 1020.

Figure 11:
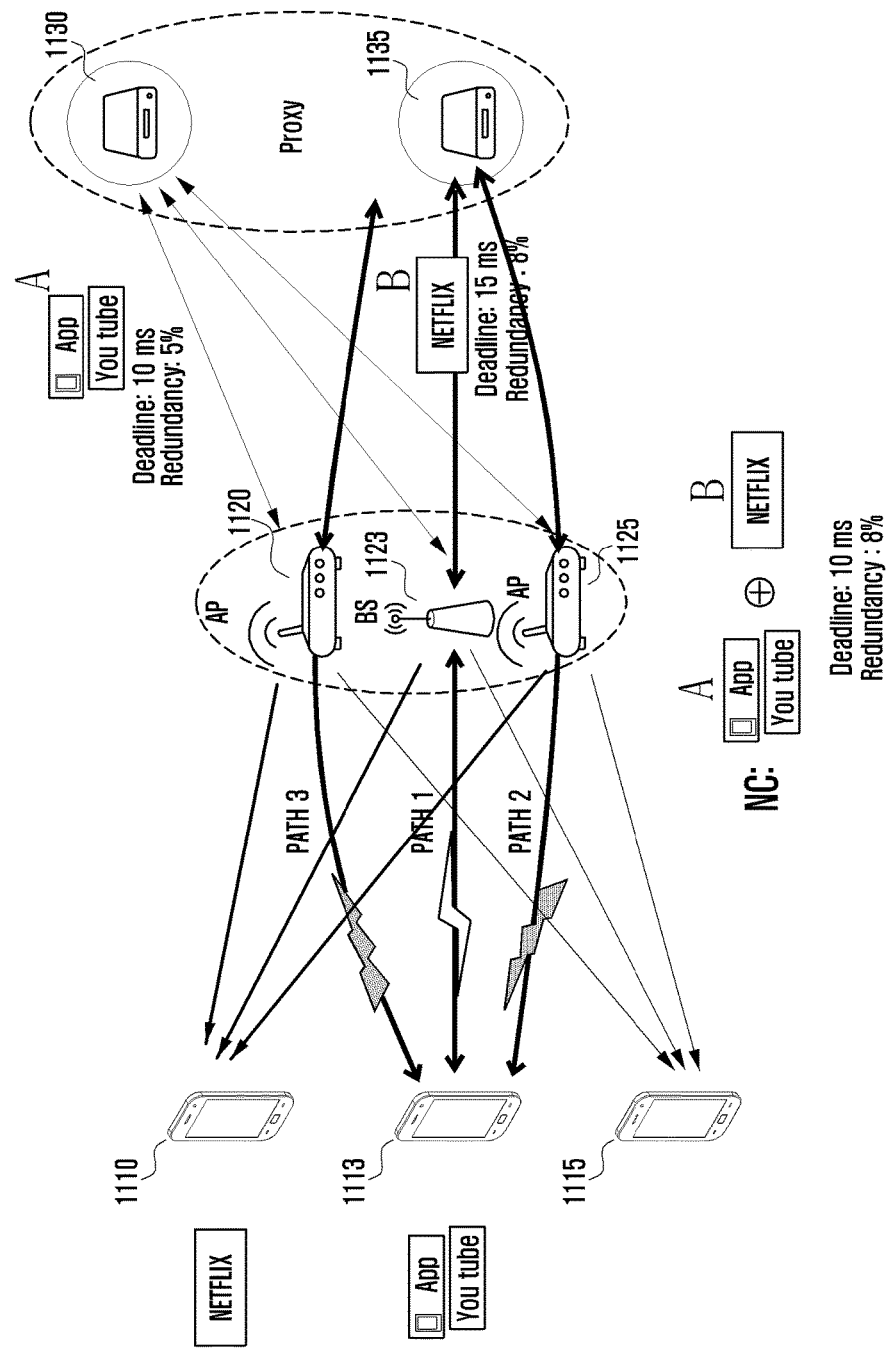
FIG. 11 illustrates synchronization for a coding between packets in a multipath and a multi-server in a communication system according to an embodiment of the present disclosure.

FIG. 11 illustrates synchronization for the coding between packets in multiple paths and multiple servers in a communication system according to an embodiment of the present disclosure.

Referring to FIG. 11, a BS or an AP may mix contents transmitted from multiple servers along multiple paths (e.g., path 1, path 2 and path 3). For example, a first proxy server 1130 may transmit a packet A (e.g., application packet or YouTube™ packet) to a first BS (or a first AP) 1120, a second BS (or a second AP) 1123, and a third BS (or a third AP) 1125. For example, a second proxy server 1135 may transmit a packet B (e.g. Netflix™ packet) to the first BS (or a first AP) 1120, the second BS (or a second AP) 1123, and the third BS (or a third AP) 1125.

At this time, the packet A and the packet B transmitted from the proxy servers 1130 and 1135, respectively may have different deadlines. The deadline refers to a time before which a packet should arrive at the UE 1110, 1113, or 1115. For example, a short deadline may correspond to a case such as when a packet for real time video streaming is transmitted. According to an example illustrated in FIG. 11, the deadline of packet A is 10 ms and the deadline of packet B is 15 ms, and accordingly, the deadlines are different from each other.

Further, the packet A and the packet B transmitted from the proxy servers 1130 and 1135, respectively may have different redundancies. The redundancy refers to information added to the original packet and transmitted to prevent the packet loss. According to the example illustrated in FIG. 11, the redundancy of packet A is 5% of 100 KB and the redundancy of packet B is 8% of 100 KB, and accordingly, the redundancies are different from each other.

As described above, when the deadlines and the redundancies of the packets transmitted from the servers 1130 and 1135 are different from each other, the BSs (or APs) 1120, 1123, and 1125 may transmit coded packets which have short deadlines and large redundancies to the UEs 1110, 1113, and 1115.

That is, when packet A and packet B transmitted from a plurality of servers 1130 and 1135 are mixed by the BSs (or APs) 1120, 1123, and 1125 and transmitted to the UEs 1110, 1113, and 1115 through the multipath, all of the packets A and B are required to arrive at the UEs 1110, 1113, and 1115 within the required time without any packet loss. Accordingly, the BSs (or APs) 1120, 1123, and 1125 may inform the servers 1130 and 1135 of information on the deadlines and the redundancies of the coded packets in the network coding. Further, the servers 1130 and 1135 may select a shorter deadline between the deadlines of packets A and B and a larger redundancy between the redundancies of packets A and B and applies the selected deadline and redundancy to the packet to be transmitted by the servers 1130 and 1135, so as to transmit the packet to the BSs (or APs) 1120, 1123, and 1125. Thereafter, the BSs (or APs) 1120, 1123, and 1125 may transmit packets generated by mixing the packets A and B to the UEs 1110, 1113, and 1115. That is, in the networking coding, the BSs (or APs) 1120, 1123, and 1125 may generate packets A+B coded according to the deadline of 10 ms and the redundancy of 8% and transmit the generated packets A+B to the UEs 1110, 1113, and 1115.

As described above, when the BSs (or APs) 1120, 1123, and 1125 receive and mix packets from a plurality of servers and transmit the mixed packets to the UEs through the multipath, a synchronization process of the deadlines and the redundancies may be required for the coding between the packets. To this end, communication between BSs/APs will be described.

FIG. 12 illustrates an example of a communication method between a BS/AP and a server according to an embodiment of the present disclosure.

Referring to FIG. 12, BSs (e.g., eNBs) 1220, 1223, and 1225 may make a request for synchronizing deadlines and redundancies of packets to servers 1210 and 1215. At this time, for the synchronization, the BSs 1220, 1223, and 1225 may transmit information on the deadlines and the redundancies of the packets to the servers 1210 and 1215. The interface between the BSs 1220, 1223 and 1225 may be an X2 interface.

Thereafter, the servers 1210 and 1215 may determine whether the synchronization of the deadlines is possible in consideration of states of queues of the BSs 1220, 1223, and 1225 and packet characteristics. Further, the servers 1210 and 1215 may transmit feedback of the determination on whether the synchronization is possible to the BSs 1220, 1223, and 1225.

In addition, the servers 1210 and 1215 may determine whether synchronization of the redundancies is possible in consideration of states of the bandwidth and the queue and transmit feedback of the determined information to the BSs 1220, 1223, and 1225.

In this case, in some embodiments, communication between the BS/AP and the server may be performed using the S1 interface without using a new interface. For example, as illustrated in FIG. 12, by adding a new process such as deadline synchronization 1250 and redundancy synchronization 1260 to the S1 interface, the communication between the BSs 1220, 1223, and 1225, and the servers 1210 and 1215 may be performed.

For example, the deadline synchronization process 1250 of the S1 interface may include operations of making a request for synchronizing deadlines, transmitting feedback such as a deadline synchronization success message when the synchronization is successful, and transmitting a deadline synchronization failure message when the synchronization fails. Similarly, the redundancy synchronization process 1260 may include operations of making a request for synchronizing redundancies, transmitting feedback such as a redundancy synchronization success message when the synchronization is successful, and transmitting a redundancy synchronization failure message when the synchronization fails.

Embodiments of the present disclosure disclosed in the specification and the drawings are only particular examples to easily describe the technical matters of the present disclosure and assist for understanding of the present disclosure, but do not limit the scope of the present disclosure. It is apparent to those skilled in the art that other modified examples based on the technical idea of the present disclosure can be implemented as well as the embodiments disclosed herein.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of communication through a multipath transmission control protocol of a plurality of nodes, the method comprising:

acquiring, by a first node communicating with one or more third nodes, information on packets requested by at least one second node, the packets including one or more packets which have been successfully transmitted from the first node and the one or more third nodes to the at least one second node and one or more packets to be transmitted from the first node and the one or more third nodes to the at least one second node;

determining, by the first node, packet combinations for coding at least one packet to be transmitted from the first node to the at least one second node and a transmission sequence of the packet combinations, by using the acquired information on the packets, wherein the transmission sequence of the packet combinations is determined to maximize a coding gain and a throughput; and transmitting, by the first node to the at least one second node, the packet combinations based on the transmission sequence, wherein each of the first node and the one or more third nodes includes a base station or an access point, wherein the at least one second node includes a terminal, and wherein the determining of the packet combinations comprises:

selecting a first combination of at least one packet, which meets a request of a largest number of the at least one second node;

selecting a second combination of at least one packet, which meets the request of the largest number of the at least one second node among remaining packets except for the at least one packet included in the first combination; and determining the transmission sequence which maximizes the coding gain and the throughput by controlling transmission sequences of the first combination and the second combination.

2. The method of claim 1, wherein the information on the packets includes at least one of information on a period indicating a previous time for which coding is performed, information on a packet participating in coding for the period, coding strategy information indicating information on how coding is performed, and information on a coding coefficient used for coding.

3. The method of claim 1, wherein the acquiring of the information on the packets comprises performing an exchange by inserting, by the first node, the information on the packets to each third node through an X2 interface.

4. The method of claim 1, further comprising, if the first node receives packets from a plurality of servers:

transmitting, by the first node, a packet deadline and redundancy synchronization request message to the plurality of servers;

receiving, by the first node, a message indicating whether deadlines and redundancies can be synchronized from the servers; and combining, by the first node, packets having the synchronized deadlines and redundancies and transmitting the combination of the packets to the UE.

5. The method of claim 4, wherein the transmission of the synchronization request message and the reception of the message are performed through an S2 interface.

6. The method of claim 5, wherein the S2 interface includes a deadline synchronization process including information on a deadline synchronization success or failure and a redundancy synchronization process including information on a redundancy synchronization success or failure.

7. A device of a first node performing communication through a multipath transmission control protocol with one or more other nodes, the device comprising:

a communication unit; and a control unit coupled to the communication unit, wherein the control unit is configured to:

control the communication unit to acquire, communicating with one or more third nodes, information on packets requested by at least one second node, the packets including one or more packets which have been successfully transmitted from the first node and the one or more third nodes to the at least one second node and one or more packets to be transmitted from the first node and the one or more third nodes to the at least one second node, determine packet combinations for coding at least one packet to be transmitted from the first node to the at least one second node and a transmission sequence of the packet combinations, by using the acquired information on the packets, wherein the transmission sequence of the packet combinations is determined to maximize a coding gain and a throughput, and control the communication unit to transmit, to the at least one second node, the packet combinations based on the transmission sequence, wherein each of the first node and the one or more third nodes includes a base station or an access point, wherein the at least one second node includes a terminal, and wherein the control unit is further configured to:

select a first combination of at least one packet which meets a request of a largest number of the at least one second node, select a second combination of at least one packet which meets the request of the largest number of the at least one second node among remaining packets except for the at least one packet included in the first combination, and determine the transmission sequence which maximizes the coding gain and the throughput by controlling transmission sequences of the first combination and the second combination.

8. The device of claim 7, wherein the information on the packets includes at least one of information on a period indicating a previous time for which coding is performed, information on a packet participating in coding for the period, coding strategy information indicating information on how coding is performed, and information on a coding coefficient used for coding.

9. The device of claim 7, wherein the control unit is further configured to perform the acquiring by inserting the information on the packets to each third node through an X2 interface.

10. The device of claim 7, wherein, if receiving packets from a plurality of servers, the control unit is further configured to:

control the communication unit to transmit a packet deadline and redundancy synchronization request message to the plurality of servers, control the communication unit to receive a message indicating whether deadlines and redundancies can be synchronized from the servers, and combine packets having the synchronized deadlines and redundancies and transmit the combination of the packets to the UE.

11. The device of claim 10, wherein the transmission of the synchronization request message and the reception of the message are performed through an S2 interface.

12. The device of claim 11, wherein the S2 interface includes a deadline synchronization process including information on a deadline synchronization success or failure and a redundancy synchronization process including information on a redundancy synchronization success or failure.

13. A non-transitory computer-readable storage medium storing instructions that, when executed, cause at least one processor to perform a method of communication through a multipath transmission control protocol of a plurality of nodes, the method comprising:

acquiring, by a first node communicating with one or more third nodes, information on packets requested by at least one second node, the packets including one or more packets which have been successfully transmitted from the first node and the one or more third nodes to the at least one second node and one or more packets to be transmitted from the first node and the one or more third nodes to the at least one second node;

determining, by the first node, packet combinations for coding at least one packet to be transmitted from the first node to the at least one second node and a transmission sequence of the packet combinations, by using the acquired information on the packets, wherein the transmission sequence of the packet combinations is determined to maximize a coding gain and a throughput; and transmitting, by the first node to the at least one second node, the packet combinations based on the transmission sequence,
wherein each of the first node and the one or more third nodes includes a base station or an access point,
wherein the at least one second node includes a terminal, and
wherein the determining of the packet combinations comprises:
  selecting a first combination of at least one packet, which meets a request of a largest number of the at least one second node;
  selecting a second combination of at least one packet, which meets the request of the largest number of the at least one second node among remaining packets except for the at least one packet included in the first combination; and
  determining the transmission sequence which maximizes the coding gain and the throughput by controlling transmission sequences of the first combination and the second combination.

\* \* \* \* \*